(No Model.) 2 Sheets—Sheet 1.
A. H. HAMON.
APPARATUS FOR THE TRANSMISSION OF ROTARY MOTION.
No. 427,987. Patented May 13, 1890.

WITNESSES:

INVENTOR:
Augustin Henri Hamon
By Richards & his Attorneys.

(No Model.) 2 Sheets—Sheet 2.

A. H. HAMON.
APPARATUS FOR THE TRANSMISSION OF ROTARY MOTION.

No. 427,987. Patented May 13, 1890.

WITNESSES:
E. B. Bolton
H. de Vos

INVENTOR:
Augustin Henri Hamon.
By Richards
his Attorneys.

United States Patent Office.

AUGUSTIN HENRI HAMON, OF PARIS, FRANCE.

APPARATUS FOR THE TRANSMISSION OF ROTARY MOTION.

SPECIFICATION forming part of Letters Patent No. 427,987, dated May 13, 1890.

Application filed July 11, 1889. Serial No. 317,179. (No model.) Patented in Belgium December 21, 1888, No. 84,379.

*To all whom it may concern:*

Be it known that I, AUGUSTIN HENRI HAMON, a citizen of the French Republic, residing at Paris, France, have invented a new and useful Apparatus for the Transmission of Rotary Motion with Increased Speed, (for which I have obtained Letters Patent in Belgium, dated December 21, 1888, No. 84,379,) of which the following is a full, clear, and exact description.

Different arrangements have been devised for the transmission of the rotary motion from a driving-shaft to another axle, which is designed to rotate at a considerably greater velocity—for instance, gearing-wheels, belts, or friction-rollers, all of a rather complicated character, or which do not present the conditions of an integral, reliable, and noiseless transmission.

My new system of transmission of rotary motion is represented in the annexed drawings, making a part of this specification.

Figure 1:
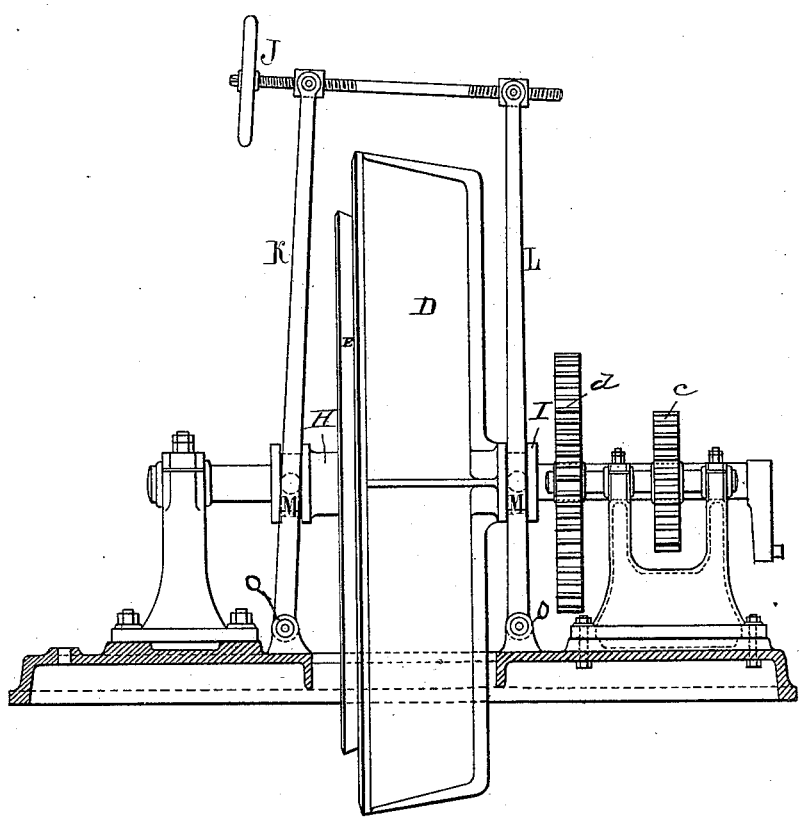
Figure 2:
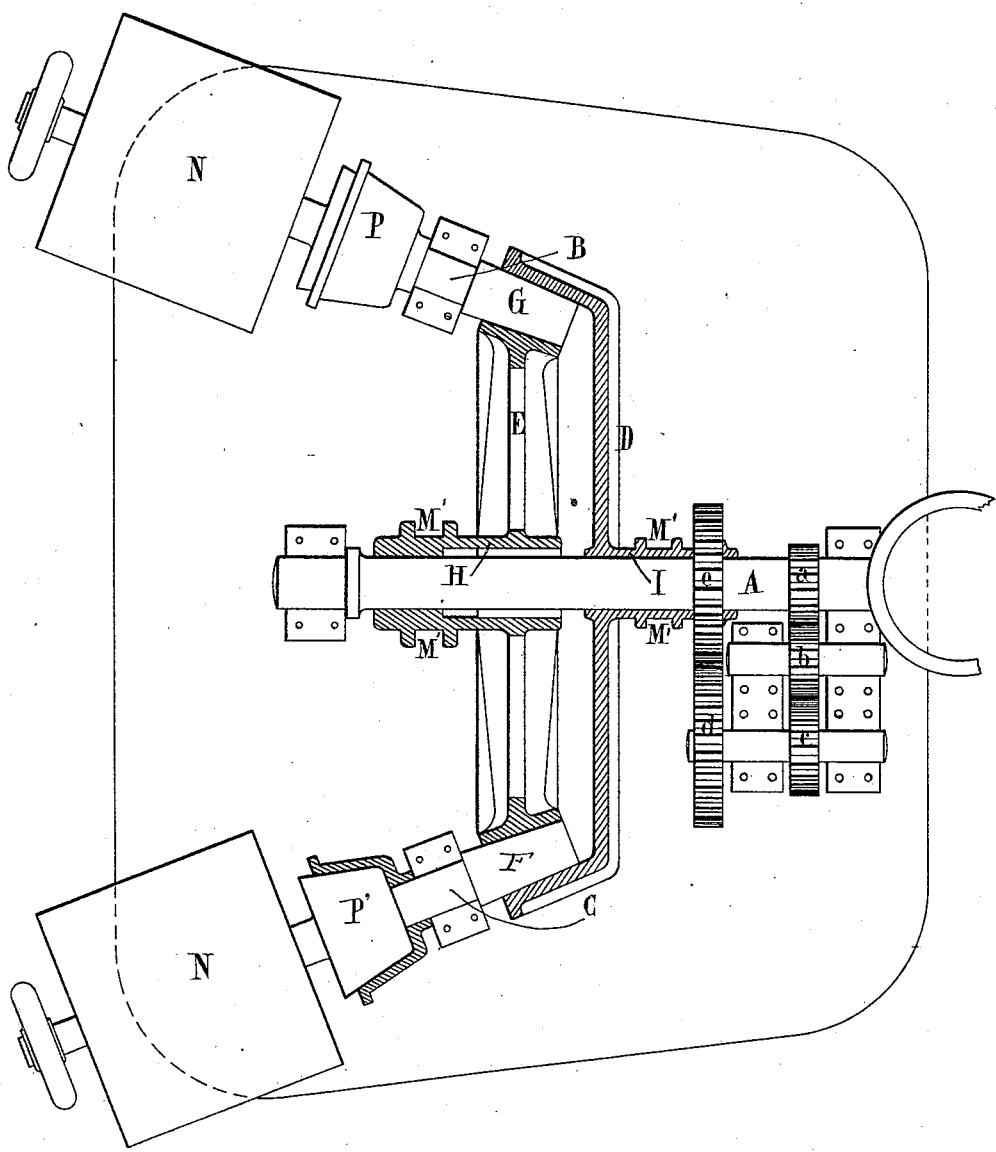

Figure 1 shows the apparatus in side elevation with the base partly in section. Fig. 2 is a horizontal section.

Suppose the shaft A to be the driving-shaft of an engine V, making one hundred revolutions, from which the motion is to be transferred to the axles B and C, which are to rotate ten times quicker. For this purpose I arrange on the driving-shaft two friction-wheels having conical or beveled acting-surfaces, of which the one D is placed loose on the shaft and the other E is movably keyed on the same. The axles B and C, which are placed so as to form an angle with the shaft A, are provided at their ends with rollers F and G of the same degree of conicity as the acting-surfaces of the wheels, and these rollers enter in the same diametrical plane between the edges of said wheels. The hubs H and I of these two wheels are grooved, and can be approached to or removed from each other by means of rod J, provided with a right and a left screw-thread acting upon the levers K and L, pivoted at O O, and which engage by the means of trunnions provided with small rollers at M M in the grooves M', arranged around said hubs H and I. The conical rollers F and G can be made of polished hard metal, or they may be provided at their periphery with a flexible matter—for instance, paper or leather—strongly compressed and then turned on the lathe.

The axles B and C can be connected with the machine or the apparatus which is to be driven—for instance, a dynamo N or N'—by means of a conical connecting-gear P P' or any other suitable device.

The shaft A, which, as stated before, can be the driving-shaft of any suitable motor, imparts the rotary motion to the wheel E, which, being pushed by the double-threaded rod J toward the supporting-wheel D, imparts through the effect of tangential friction a very rapid rotary motion to the conical rollers F and G. The degree of friction can be varied at pleasure by the manipulation of the rod J.

The method of transmission described is direct and with single action, the motion being only transmitted by the interior wheel E, while the exterior wheel D only serves as a movable support to convert the supporting-wheel D into a driving-wheel, in which case the apparatus works with double action. I arrange alongside the shaft A a back gearing $a\,b\,c\,d\,e$, the first wheel $a$ being keyed on the main shaft and the last $e$ on the hub I of the wheel D. These wheels are constructed so that the circumferential speed of the interior conical surface of the wheel D will be equal to that of the conical outward surface of the wheel E. In this manner two equal and tangential powers act diametrically opposite on the conical rollers.

The motion of the shaft A can be transferred to more than two axles, provided their conical rollers be located at equal distances between the operating-surfaces of the wheels. In the same manner the motion can be transferred only to a single axle or any number of them by disengaging the others from their conical rollers, which serve in this case only as intermediate supports for the equal distribution of the strain over the conical surfaces of the wheels.

It is evident that the same apparatus in an inverse sense enables me to considerably decrease a great velocity of revolution.

Having fully described my invention, what I claim as new, and desire to secure by Letters Patent, is—

1. An apparatus for transmitting rotary motion, consisting, essentially, of an operating-shaft for transmitting motion, friction-wheels having conical or beveled acting-surfaces of different diameters, one of which is secured to and is rotated by said shaft, rollers interposed between said wheels and receiving motion therefrom, and an operating-shaft driven by one of said rollers and provided with means whereby it is adapted to be connected to the apparatus to be driven, substantially as set forth.

2. In an apparatus for transmitting rotary motion, the combination of two wheels, one within the other, and having, respectively, an outer and an inner acting-face, rollers or wheels between and engaged by said faces and adapted to be connected with the apparatus to be driven, and power devices which are connected with said first-mentioned two wheels and are adapted to drive them in opposite directions, substantially as set forth.

3. In an apparatus for transmitting rotary motion at increased speed, the combination, with the shaft A, friction-wheels D E, and rollers F G, of the levers K L and the right and left screw-threaded rod J, said rod working in the screw-threaded ends of said levers, substantially as described.

4. In an apparatus for transmitting rotary motion with increased speed, the combination, with the shaft A, friction-wheels D E, and rollers F G, of the back gear a b c d e, all arranged and adapted to operate substantially as described.

5. The combination of a friction-wheel E, movably keyed on the driving-shaft A, and of another exterior friction-wheel D, loose on said shaft, between which wheels are arranged the conical rollers F G, diametrically opposed or at equal distances, which rollers are connected by means of the axles B C with the machines or apparatus to which the rapid rotary motion is to be imparted in such a way that the motion can be transmitted to all axles or to any suitable part of same, the wheels D E being adjustable by means of the double-threaded rod J, acting on the levers K and L, and acting with only the wheel E as driving-wheel or with double action by connecting the loose outer wheel D, also in a driving-wheel, by means of the back gear a b c d e, substantially as and for the purpose hereinbefore described and set forth.

6. An apparatus for transmitting rotary motion with increased speed, consisting, essentially, of an operating-shaft for transmitting motion, friction-wheels having conical or beveled acting-surfaces of different diameters mounted on said shaft, substantially as described, power devices which rotate said wheels in opposite directions, and two or more conical rollers interposed between said wheels and receiving motion therefrom, which motion is imparted from said rollers by suitable operating-shafts connected thereto, substantially as set forth.

7. An apparatus for transmitting rotary motion with increased speed, consisting, essentially, of an operating-shaft for transmitting motion, a friction-wheel, as E, keyed upon said shaft, a friction-wheel, as D, of larger diameter than wheel E, mounted loosely upon said shaft, a series of conical rollers interposed between said wheels at equal distances apart and receiving motion therefrom by friction, and operating-shafts driven by said rollers and provided with means whereby they are adapted to be connected with the apparatus to be driven independently of the first-mentioned shaft, substantially as set forth.

In testimony whereof I have signed this specification in the presence of two subscribing witnesses.

AUGUSTIN HENRI HAMON

Witnesses:
G. DUPONT,
CH. CASALONGE.